United States Patent [19]
Tanaka et al.

[11] Patent Number: 5,362,574
[45] Date of Patent: Nov. 8, 1994

[54] MULTILAYER ALUMINUM-BASED ALLOY BEARING HAVING SUPERIOR COMPATIBILITY AND SUPERIOR FATIGUE RESISTANCE

[75] Inventors: Tadashi Tanaka, Konan; Masaaki Sakamoto, Nagoya; Yoshiaki Sato, Gifu, all of Japan

[73] Assignee: Daido Metal Company Ltd., Nagoya, Japan

[21] Appl. No.: 52,679

[22] Filed: Apr. 27, 1993

[30] Foreign Application Priority Data

Apr. 28, 1992 [JP] Japan .................. 4-108221

[51] Int. Cl.$^5$ ............................. F16C 33/12
[52] U.S. Cl. .................. 428/643; 428/653; 428/654; 384/912
[58] Field of Search .......... 428/654, 653, 643, 645, 428/646, 650; 384/912

[56] References Cited

U.S. PATENT DOCUMENTS

| | | |
|---|---|---|
| 3,195,991 | 7/1965 | Stern et al. ............ 428/654 |
| 3,950,141 | 4/1976 | Roemer ................. 428/654 |
| 4,188,079 | 2/1980 | Mori .................... 428/654 |
| 4,189,525 | 2/1980 | Mori .................... 428/654 |
| 5,112,416 | 5/1992 | Tanaka et al. ......... 428/654 |
| 5,162,100 | 11/1992 | Tanaka et al. ........ 384/912 |

FOREIGN PATENT DOCUMENTS

| | | | |
|---|---|---|---|
| 55-14823 | 2/1980 | Japan | 428/654 |
| 62-14024 | 3/1987 | Japan . | |
| 3168411 | 7/1991 | Japan . | |

*Primary Examiner*—John Zimmerman
*Attorney, Agent, or Firm*—Browdy and Neimark

[57] ABSTRACT

A multilayer aluminum-based alloy plain bearing having superior compatibility and superior fatigue resistance, comprising a steel back metal, an aluminum alloy intermediate bonding layer bonded to the steel back metal, and an Al—Sn—Si family bearing alloy layer bonded to the intermediate bonding layer, the aluminum bearing alloy layer consisting, by weight, of 7 to 15% Sn, 0.5 to 3% Si, and the balance Al and incidental impurities, the hardness of the aluminum bearing alloy layer being less than 50 Vickers hardness, the aluminum alloy intermediate bonding layer consisting, by weight, of at least one kind selected from the group consisting of 0 to 1.7% Mn, 0 to 1.2% Cu and 0 to 1.8% Mg, and the balance Al and incidental impurities, Vickers hardness of the aluminum alloy intermediate bonding layer being in a range of not less than 60% of the Vickers hardness of the aluminum bearing alloy layer but not more than 120% of the Vickers hardness of the aluminum bearing alloy layer.

15 Claims, 2 Drawing Sheets

FIG. 1

RESULTS OF FATIGUE TEST No. 1

("———" MEANS VARIATION OCCURRING DURING TESTS)

| | No. | MAXIMUM PRESSURE WHICH DOES NOT CAUSE FATIGUE (Kgf cm²) 350 400 450 500 550 |
|---|---|---|
| BEARINGS FOR COMPARISON | 1 | |
| | 2 | |
| | 3 | |
| | 4 | |
| | 5 | |
| | 6 | |
| | 7 | |
| | 8 | |
| | 9 | |
| | 10 | |
| | 11 | |
| | 12 | |
| | 13 | |
| | 14 | |
| | 15 | |
| BEARING OF THE INVENTION | 16 | |
| | 17 | |
| | 18 | |
| | 19 | |
| | 20 | |
| | 21 | |
| | 22 | |
| | 23 | |
| | 24 | |
| | 25 | |
| | 26 | |
| | 27 | |
| | 28 | |
| | 29 | |

FIG. 2

RESULTS OF FATIGUE TEST No. 2

("———" MEANS VARIATION OCCURRING DURING TESTS)

| | No. | MAXIMUM PRESSURE WHICH DOES NOT CAUSE FATIGUE (Kgf/cm²) 800 — 900 — 1000 — 1100 — 1200 |
|---|---|---|
| BEARINGS FOR COMPARISON | 1 | up to ~800 |
| | 2 | 800–900 |
| | 3 | up to ~800 |
| | 4 | up to ~900 |
| | 5 | up to ~1000 |
| | 6 | up to 1000 (var. 900–1000) |
| | 7 | up to 1000 (var. 900–1000) |
| | 8 | up to ~1000 |
| | 9 | up to 1000 (var. 900–1000) |
| | 10 | up to 1000 (var. 900–1000) |
| | 11 | up to ~1000 |
| | 12 | up to ~1000 |
| | 13 | up to ~1000 |
| | 14 | up to ~800 |
| | 15 | up to 1000 (var. 900–1000) |
| BEARING OF THE INVENTION | 16 | up to 900 (var. 800–900) |
| | 17 | up to ~1000 |
| | 18 | up to ~900 |
| | 19 | up to ~1050 |
| | 20 | up to ~1000 |
| | 21 | up to ~1000 |
| | 22 | up to 1100 (var. 1000–1100) |
| | 23 | up to ~1000 |
| | 24 | up to 1100 (var. 1000–1100) |
| | 25 | up to ~1000 |
| | 26 | up to 1100 (var. 1000–1100) |
| | 27 | up to ~1000 |
| | 28 | up to ~1050 |
| | 29 | up to ~900 |

MULTILAYER ALUMINUM-BASED ALLOY BEARING HAVING SUPERIOR COMPATIBILITY AND SUPERIOR FATIGUE RESISTANCE

BACKGROUND OF THE INVENTION

1. Field of the Invention

The present invention relates to a multilayer aluminum alloy plain bearing having superior compatibility and superior fatigue resistance which is to be used in high-power engines for automobile and general industrial machinery.

2. Description of the Related Art

As conventional well-known aluminum-based alloy bearing, Japanese Patent Examined Publication No. 62-14024 discloses a one in which a bearing alloy has an Al-Sn alloy layer and a back metal both bonded to each other through an intermediate bonding layer of Al or Al alloy which is low in hardness so as to form a bearing through machining, and Japanese Patent Unexamined Publication No. 3-168411 discloses another one in which a hard Al bearing alloy and a back metal are bonded to each other through a well-balanced reinforcing intermediate layer.

The former of these conventional bearings is excellent in compatibility and non-seizability which are important characteristics for the plain bearing. However, with the progress of speed-up and power-up of internal combustion engine in recent years, the load applied to the bearing is increased as well, thereby giving rise to a problem that fatigue and crack are apt to take place particularly in the intermediate bonding layer. Concerning the latter, on the other hand, it has become eagerly required to have an excellent fatigue strength and such compatibility that the bearing can follow misalignment of the housing and change in the shaft form when used as a main bearing metal of the engine and so forth.

SUMMARY OF THE INVENTION

An object of the present invention is to provide a multilayer aluminum-based alloy bearing (plain bearing) which is excellent in both compatibility and fatigue resistance, while overcoming the aforesaid problems.

① To achieve this end, in accordance with a first aspect of the present invention, a multilayer aluminum-based alloy bearing having superior compatibility and superior fatigue resistance, comprises a steel back metal, an intermediate bonding layer bonded to the steel back metal, and an aluminum bearing alloy layer bonded to the intermediate bonding layer, the aluminum bearing alloy layer consisting, by weight, of 7 to 15% Sn, 0.5 to 3% Si, and the balance Al and incidental impurities, the hardness of the aluminum bearing alloy layer being less than 50 Vickers hardness, the intermediate bonding layer consisting, by weight, of at least one kind selected from the group consisting of 0 to 1.7% Mn, 0 to 1.2% Cu and 0 to 1.8% Mg, and the balance Al and incidental impurities, Vickers hardness of the intermediate bonding layer being in a range of not less than 60% of the Vickers hardness of the aluminum bearing alloy layer but not more than 120% of the Vickers hardness of the aluminum bearing alloy layer.

② In accordance with a second aspect of the present invention, in a multilayer aluminum-based alloy bearing having superior compatibility and superior fatigue resistance according to the item ①, the aluminum bearing alloy layer further contains, by weight, at least one or two kinds selected from the group consisting of 0.2 to 5% Cu, 0.1 to 3% Pb, 0.1 to 3% Sb, Mn, Mg, V, Ni and 0.01 to 1% Ti, the total amount of Mn, Mg, V and Ni being in a range of 0.01 to 3%.

③ In accordance with a third aspect of the present invention, in a multilayer aluminum-based alloy bearing having superior compatibility and superior fatigue resistance according to the item ① or ②, the intermediate bonding layer further contains at least one kind selected from the group consisting of Si, Cr, Zr, Ti, B, V and Fe, the total amount thereof being not more than 3% by weight.

④ In accordance with a fourth aspect of the present invention, in a multilayer aluminum-based alloy bearing having superior compatibility and superior fatigue resistance according to any one of the items ① to ③, an overlay of Sn, Pb or an alloy having Sn, Pb for its main components is formed on the aluminum bearing alloy layer.

⑤ In accordance with a fifth aspect of the present invention, in a multilayer aluminum-based alloy bearing having superior compatibility and superior fatigue resistance according to any one of the items ① to ④, the bearing is flash-plated on the surface thereof with Sn, Pb or an alloy thereof.

Next, the reason why the components of each of the layers of the multilayer aluminum alloy plain bearing having superior compatibility and superior fatigue resistance according to the present invention are limited as recited in the claims and the function and effect resulting from that limitation will be explained in the following.

(1) The hardness of the aluminum bearing alloy layer is less than 50 Vickers hardness and the hardness of the intermediate bonding layer is in a range of not less than 60% of the Vickers hardness of the aluminum bearing alloy layer but not more than 120% of the Vickers hardness of the aluminum bearing alloy layer.

① If the hardness of the aluminum bearing alloy layer is not less than 50 Vickers hardness, it will be impossible to obtain such compatibility as compensating misalignment of the housing and change in the shaft form when used as a main bearing metal of the engine and so forth, that is, an aluminum alloy bearing will become lacking in compatibility and adaptability with respect to the shaft.

② If the hardness of the intermediate bonding layer is less than 60% of the hardness of the aluminum bearing alloy layer, in a case of using the bearing under severe conditions, there will be caused such a problem that main components of the aluminum bearing alloy layer will diffuse into the intermediate bonding layer or the intermediate bonding layer itself will suffer from fatigue, deformation or crack.

On the other hand, if the hardness of the intermediate bonding layer is more than 120% of the hardness of the aluminum bearing alloy layer, the compatibility of the bearing alloy layer will be deteriorated undesirably.

(2) Aluminum bearing alloy layer

① Sn: 7 to 15 weight %

Surface performance such as non-seizability, compatibility and embedability as the bearing is improved by this component. If addition of Sn is less than 7%, this effect is insufficient, while if it exceeds 15%, mechanical property of the bearing alloy layer is deteriorated to make it impossible to use it under severe conditions.

② Si: 0.5 to 3 weight % i) Si is in solid-solution state in the Al matrix or crystallized as Si particles having a high hardness, thereby increasing the strength of the alloy.

ii) Since Si particles are dispersed, only the Al matrix the surface of which is soft is worn out so that the surface is made uneven as observed microscopically. Si in convex portions serves to bear high load while maintaining adhesion-resistance, while concave portions serve as oil sump, thus making it possible to withstand the high load, thin oil film and, further, even metal to metal contact.

iii) Si particles dispersed finely have a function of polishing the edge and burrs of the mating shaft, thereby improving the non-seizability.

iv) If addition of Si is less than 0.5%, the expected effects described above cannot be attained, while if it exceeds 3%, the aluminum bearing alloy layer becomes brittle, which results in deterioration of the plastic workability in rolling or the like.

③ Mn, Mg, V, Ni: 0.01 to 3 weight % in total

In order to increase the fatigue strength, these components are in solid solution state in the Al matrix or crystallized as intermetallic compound. If addition of these components is less than 0.01%, expected effect is insufficient, while exceeding 3%, the compatibility is deteriorated and the plastic workability is also deteriorated.

④ Cu: 0.2 to 5 weight %

Strength of the Al matrix is increased by this copper. Cu is very effective to increase the fatigue strength. If addition is less than 0.2%, this effect is insufficient, while exceeding 5%, the aluminum bearing alloy layer becomes too hard, resulting in that the compatibility and the plastic workability are deteriorated.

⑤ Pb: 0.1 to 3 weight %

Machinability and non-seizability are improved by this element. In this case, if addition of Pb is less than 0.1%, the effect is insufficient, while exceeding 3%, it becomes very difficult for Pb to be uniformly dispersed into the Al matrix. Further, even the strength is affected in a case of Pb exceeding 3%.

⑥ Sb: 0.1 to 3 weight %

Mechanical property of the Al matrix is improved by this element. Further, in case that Sb and Pb coexist, Sb has an effect of dispersing Pb into Al finely and uniformly.

If addition of Sb is less than 0.1%, this effect is insufficient, while exceeding 3%, the mechanical property, particularly the elongation, is reduced unfavorably.

⑦ Ti: 0.01 to 1 weight %

In order to increase the fatigue strength, Ti is made to be in solid solution state in the Al matrix or to be crystallized as intermetallic compound. If addition of Ti is less than 0.01%, the effect is insufficient, while exceeding 1%, the compatibility and the plastic workability are deteriorated.

(3) Aluminum alloy intermediate layer

① Si, Cr, Zr, Ti, B, V, Fe: at least one kind thereof in an amount of 0 to 3 weight % in total These reinforcing elements are in solid-solution state in the Al matrix or finely crystallized or precipitated without producing any rough compound.

If addition of at least one kind of these elements exceeds 3 weight % in total, the aluminum alloy intermediate layer becomes too hard.

BRIEF DESCRIPTION OF THE DRAWINGS

FIG. 1 shows the results of first bearing fatigue test; and

FIG. 2 shows the results of second bearing fatigue test.

DESCRIPTION OF THE PREFERRED EMBODIMENTS

The present invention will be described below by referring to preferred embodiments.

Table 1 and Table 2 show the chemical compositions of bearing alloy layers and intermediate bonding layers of conventional (comparative) bearings and bearings according to the present invention, respectively.

Components shown in Tables 1 and 2 were subjected to ordinary casting and rolling to make aluminum bearing alloy sheets and aluminum alloy sheets for intermediate bonding layer. Subsequently, the aluminum alloy sheets for intermediate bonding layer were overlaid on the surface of the aluminum bearing alloy sheets and they were pressure-welded to each other by rolls so as to form composite aluminum sheets.

A low-carbon steel strip (containing 0.04 to 0.35 wt. % of carbon) serving as the steel back metal was overlapped on the composite sheet at the side of the aluminum alloy used for intermediate bonding layer and both were pressure-welded (bonded) each other by rolls at a reduction rate of 35 to 50%, thus obtaining the aluminum alloy bearing materials according to the prior art and the present invention.

In the aluminum alloy bearing materials thus obtained, the thickness of the intermediate bonding layer was in the range of 0.02 to 0.06 mm and the thickness of the back metal layer was in the range of 1.17 to 1.23 mm, while the overall thickness of each material was 1.5 mm.

Vickers hardness of the bearing alloy layer and the intermediate bonding layer and the value of (hardness of intermediate bonding layer)/(hardness of bearing alloy layer)×100 of each bearing are shown in Tables 1 and 2.

The bearings were tested regarding two kinds of fatigue tests (fatigue test ①, fatigue test ②). The test conditions are shown in Tables 3 and 4 and the test results are shown in FIGS. 1 and 2.

According to the fatigue test ①, the test shaft is made to be in uniform contact with the test bearings, while, according to the fatigue test ②, the test shaft is made to be in very uneven contact with the bearings beyond usual degree so that the bearings are required to have large compatibility.

Incidentally, in the above-described embodiments, no overlay was employed with the intention of showing the effects of the bearing alloy layer and the intermediate bonding layer clearly. However, it is possible to obtain the same effects as that explained herein even if an alloy overlay such as Pb alloy is formed thereon.

Further, in order to improve the bonding strength with respect to the aluminum bearing alloy layer, an intermediate layer of Cu or Ni or an alloy thereof may be provided between the aluminum bearing alloy layer and the overlay.

Concerning the test bearings shown in Table 1, the bearings No. 1 to No. 15 are the ones for the comparison with the bearings of the present invention. Among them, the bearings No. 1, No. 3 and No. 14 each employ an intermediate bonding layer having a hardness higher than the hardness limit according to the present invention. On the other hand, the test bearings No. 16 to No. 29 shown in Table 2 are the ones of the present invention which use the bearing alloys corresponding to those of the aforesaid comparison bearings No. 1 to No. 14, respectively so far as the chemical compositions are concerned. The bearing No. 15 uses a bearing alloy having a hardness higher than the hardness limit according to the present invention.

Analysis of the test results (FIGS. 1 and 2) shows the following facts. From the results of the fatigue test ①, it is proved that fatigue takes place in all of the bearings according to the present invention at higher load than in the comparative bearings except that the comparative bearings No. 1, No. 3 and No. 14 show the same results as the bearings No. 16, No. 18 and No. 29 according to the present invention, respectively. Further, according to the fatigue test ②, more excellent results were obtained in the bearings according to the present invention than in the comparative bearings. Particularly, fatigue took place at low load even in the comparative bearings No. 1, No. 3 and No. 14 which were by no means inferior to the bearings of the present invention in the fatigue test ①. The reason for this is considered that they are lacking in compatibility and cushionability as for the bearing. In addition, concerning the bearing No. 15, although it has a very excellent fatigue strength as seen from the results of the fatigue test ①, fatigue took place at unexpectedly low load in some cases when the shaft was made to be very uneven contact with the bearing extremely locally as in the fatigue test ②.

As described above, the compatibility and the fatigue resistance of the bearings according to the present invention are improved as compared with those of the conventional bearings, and therefore, it is possible to attain the desired object.

TABLE 1

| Comparative Bearings | Composition of bearing alloy (wt %) | | | | | | | | | | | Hardness of bearing alloy |
|---|---|---|---|---|---|---|---|---|---|---|---|---|
| | Al | Sn | Si | Mn | Mg | V | Ni | Cu | Pb | Sb | Ti | Hv5 |
| 1 | Rem | 7.0 | 0.5 | — | — | — | 0.1 | 1.0 | — | — | — | 39 |
| 2 | Rem | 7.0 | 1.0 | — | — | — | — | — | — | — | — | 38 |
| 3 | Rem | 10.0 | 0.8 | — | — | 0.01 | — | — | — | 3.0 | — | 43 |
| 4 | Rem | 10.0 | 0.5 | — | — | — | 0.2 | 0.8 | 1.5 | 0.1 | — | 46 |
| 5 | Rem | 12.0 | 0.5 | — | — | — | 3.0 | — | — | — | — | 49 |
| 6 | Rem | 12.0 | 2.0 | 0.01 | — | 0.1 | — | 0.2 | 3.0 | 0.4 | — | 40 |
| 7 | Rem | 12.0 | 1.5 | — | 3.0 | — | — | 0.8 | — | — | 1.0 | 47 |
| 8 | Rem | 12.0 | 2.5 | — | — | 0.2 | — | 1.0 | 1.5 | 0.3 | — | 45 |
| 9 | Rem | 12.0 | 1.0 | — | — | 3.0 | — | — | 2.0 | 0.2 | — | 49 |
| 10 | Rem | 15.0 | 0.5 | — | — | — | — | 5.0 | — | — | — | 49 |
| 11 | Rem | 15.0 | 3.0 | — | 0.5 | — | — | — | — | — | 0.05 | 43 |
| 12 | Rem | 15.0 | 0.5 | 3.0 | — | — | — | — | 1.0 | — | — | 49 |
| 13 | Rem | 15.0 | 2.0 | 0.3 | 0.01 | — | — | 0.9 | 1.0 | 0.1 | 0.01 | 47 |
| 14 | Rem | 15.0 | 0.5 | — | — | — | — | 0.5 | 1.0 | 0.1 | — | 34 |
| 15 | Rem | 10.0 | 2.0 | 0.4 | — | — | 1.0 | 1.2 | — | 0.3 | — | 55 |

| Comparative Bearings | Composition of intermediate bonding layer (wt %) | | | | | | | | | | | Hardness of intermediate layer | *Hv of intermediate layer Hv of Alloy layer |
|---|---|---|---|---|---|---|---|---|---|---|---|---|---|
| | Al | Mn | Cu | Mg | Si | Cr | Zr | Ti | B | V | Fe | Hv5 | |
| 1 | Rem | 1.0 | 1.2 | 0.5 | 0.8 | — | — | — | — | — | 0.7 | 48 | 123.1 |
| 2 | Rem | — | — | — | — | — | — | — | — | — | — | 21 | 55.3 |
| 3 | Rem | 1.0 | — | 3.0 | 0.3 | 0.2 | 0.3 | — | — | — | 0.4 | 60 | 140.0 |
| 4 | Rem | — | — | — | — | — | — | — | — | — | — | 21 | 45.7 |
| 5 | Rem | — | — | — | — | — | — | — | — | — | — | 21 | 42.9 |
| 6 | Rem | — | — | — | — | — | — | — | — | — | — | 21 | 52.5 |
| 7 | Rem | — | — | — | — | — | — | — | — | — | — | 21 | 44.7 |
| 8 | Rem | — | — | — | — | — | — | — | — | — | — | 21 | 46.7 |
| 9 | Rem | — | — | — | — | — | — | — | — | — | — | 21 | 42.9 |
| 10 | Rem | — | — | — | — | — | — | — | — | — | — | 21 | 42.9 |
| 11 | Rem | — | — | — | — | — | — | — | — | — | — | 21 | 48.8 |
| 12 | Rem | — | — | — | — | — | — | — | — | — | — | 21 | 42.9 |
| 13 | Rem | — | — | — | — | — | — | — | — | — | — | 21 | 44.7 |
| 14 | Rem | 1.0 | 1.2 | 0.5 | 0.8 | — | — | — | — | — | 0.7 | 48 | 141.2 |
| 15 | Rem | — | 0.5 | 0.5 | 1.0 | 0.3 | — | 0.2 | — | — | 1.0 | 35 | 63.6 |

*Hardness of intermediate bonding layer/Hardness of bearing alloy layer × 100

TABLE 2

| Bearings of Present Invention | Composition of bearing alloy (wt %) | | | | | | | | | | | Hardness of bearing alloy |
|---|---|---|---|---|---|---|---|---|---|---|---|---|
| | Al | Sn | Si | Mn | Mg | V | Ni | Cu | Pb | Sb | Ti | Hv5 |
| 16 | Rem | 7.0 | 0.5 | — | — | — | 0.1 | 1.0 | — | — | — | 39 |
| 17 | Rem | 7.0 | 1.0 | — | — | — | — | — | — | — | — | 38 |
| 18 | Rem | 10.0 | 0.8 | — | — | 0.01 | — | — | — | 3.0 | — | 43 |
| 19 | Rem | 10.0 | 0.5 | — | — | — | 0.2 | 0.8 | 1.5 | 0.1 | — | 46 |
| 20 | Rem | 12.0 | 0.5 | — | — | — | 3.0 | — | — | — | — | 49 |
| 21 | Rem | 12.0 | 2.0 | 0.01 | — | 0.1 | — | 0.2 | 3.0 | 0.4 | — | 40 |
| 22 | Rem | 12.0 | 1.5 | — | 3.0 | — | — | 0.8 | — | — | 1.0 | 47 |
| 23 | Rem | 12.0 | 2.5 | — | — | 0.2 | — | 1.0 | 1.5 | 0.3 | — | 45 |

TABLE 2-continued

| | | | | | | | | | | | | |
|---|---|---|---|---|---|---|---|---|---|---|---|---|
| 24 | Rem | 12.0 | 1.0 | — | — | 3.0 | — | — | 2.0 | 0.2 | — | 49 |
| 25 | Rem | 15.0 | 0.5 | — | — | — | — | 5.0 | — | — | — | 49 |
| 26 | Rem | 15.0 | 3.0 | — | 0.5 | — | — | — | — | — | 0.05 | 43 |
| 27 | Rem | 15.0 | 0.5 | 3.0 | — | — | — | — | 1.0 | — | — | 49 |
| 28 | Rem | 15.0 | 2.0 | 0.3 | 0.01 | — | — | 0.9 | 1.0 | 0.1 | 0.01 | 47 |
| 29 | Rem | 15.0 | 0.5 | — | — | — | — | 0.5 | 1.0 | 0.1 | — | 34 |

| Bearings of Present Invention | Composition of intermediate bonding layer (wt %) | | | | | | | | | | | Hardness of intermediate layer Hv5 | *Intermediate layer Alloy layer |
|---|---|---|---|---|---|---|---|---|---|---|---|---|---|
| | Al | Mn | Cu | Mg | Si | Cr | Zr | Ti | B | V | Fe | | |
| 16 | Rem | 0.1 | 0.5 | — | — | — | — | — | — | — | — | 25 | 64.1 |
| 17 | Rem | — | — | — | 2.5 | — | — | 0.25 | 0.05 | — | — | 29 | 76.3 |
| 18 | Rem | — | — | — | 2.5 | — | — | 0.25 | 0.05 | — | — | 29 | 67.4 |
| 19 | Rem | 0.5 | 1.0 | — | — | — | 0.5 | — | — | — | — | 30 | 65.2 |
| 20 | Rem | — | — | 1.8 | — | 0.2 | — | — | — | — | — | 50 | 102.0 |
| 21 | Rem | 1.3 | 0.2 | — | — | — | — | — | — | — | — | 40 | 100.0 |
| 22 | Rem | — | — | — | 2.5 | — | — | 0.25 | 0.05 | — | — | 29 | 61.7 |
| 23 | Rem | 1.3 | 0.2 | — | — | — | — | — | — | — | — | 40 | 88.9 |
| 24 | Rem | — | 0.5 | 0.5 | 1.0 | 0.3 | — | 0.2 | — | — | 1.0 | 35 | 71.4 |
| 25 | Rem | 1.0 | 1.2 | 0.5 | 0.8 | — | — | — | — | — | 0.7 | 48 | 98.0 |
| 26 | Rem | 1.7 | 0.1 | — | — | — | — | — | — | 0.2 | — | 46 | 107.0 |
| 27 | Rem | — | 0.5 | 0.5 | 1.0 | 0.3 | — | 0.2 | — | — | 1.0 | 35 | 71.4 |
| 28 | Rem | 0.5 | 1.0 | — | — | — | 0.5 | — | — | — | — | 30 | 63.8 |
| 29 | Rem | — | — | — | — | — | — | — | — | — | — | 21 | 61.8 |

*Hardness of intermediate bonding layer/Hardness of bearing alloy layer × 100

TABLE 3

| Test Conditions Fatigue Test 1 | |
|---|---|
| Test Machine | Soda-type fatigue test machine |
| Rotational Speed | 4,000 r.p.m. |
| Test Time | 20 Hrs. |
| Circumferential Speed | 11.1 m/sec. |
| Lubricating Oil Temperature | 120° C. |
| Lubricating Oil Pressure | 3.0 Kg/cm² |
| Lubricating Oil | #20 motor oil |

TABLE 4

| Test Conditions Fatigue Test 2 | |
|---|---|
| Test Machine | Sapphire type fatigue test machine |
| Rotational Speed | 3,250 r.p.m. |
| Test Time | 20 Hrs. |
| Circumferential Speed | 9.0 m/sec. |
| Lubricating Oil Temperature | 120° C. |
| Lubricating Oil Pressure | 3.0 Kg/cm² |
| Lubricating Oil | #20 motor oil |

What is claimed is:

1. A multilayer aluminum-based alloy bearing having superior compatibility and superior fatigue resistance, comprising a steel back metal, an intermediate bonding layer bonded to the steel back metal, and an aluminum bearing alloy layer bonded to the intermediate bonding layer, said aluminum bearing alloy layer consisting essentially of, by weight, of 7 to 15% Sn, 0.5 to 3% Si, and the balance Al and incidental impurities, the hardness of said aluminum bearing alloy layer being less than 50 Vickers hardness, said intermediate bonding layer consisting essentially of, by weight, of at least one metal selected from the group consisting of 0 to 1.7% Mn, 0 to 1.2% Cu and 0 to 1.8% Mg, and the balance Al and incidental impurities, Vickers hardness of said intermediate bonding layer being in a range of not less than 60% of the Vickers hardness of the aluminum bearing alloy layer but not more than 120% of the Vickers hardness of the aluminum bearing alloy layer.

2. A multilayer aluminum-based alloy bearing having superior compatibility and superior fatigue resistance according to claim 1, wherein the aluminum bearing alloy layer further contains, by weight, at least one metal selected from the group consisting of not more than 5% Cu, not more than 3% Pb, not more than 3% Sb, and at least one metal in an amount not more than 3% in total selected from the group consisting of Ti, Mn, Mg, V and Ni.

3. A multilayer aluminum-based alloy bearing having superior compatibility and superior fatigue resistance according to claim 2, wherein the intermediate bonding layer further contains at least one kind selected from the group consisting of Si, Cr, Zr, Ti, B, V and Fe, the total amount thereof being not more than 3% by weight.

4. A multilayer aluminum-based alloy bearing having superior compatibility and superior fatigue resistance according to claim 3, wherein an overlay of Sn, Pb or an alloy containing Sn and/or Pb as its main components is formed on the aluminum bearing alloy layer.

5. A multilayer aluminum-based alloy bearing having superior compatibility and superior fatigue resistance according to claim 4, wherein the bearing is provided on the surface thereof with flash-plated layer of Sn or Pb or an alloy of Sn and/or Pb.

6. A multilayer aluminum-based alloy bearing having superior compatibility and superior fatigue resistance according to claim 3, wherein the bearing is provided on the surface thereof with flash-plated layer of Sn or Pb or an alloy of Sn and/or Pb.

7. A multilayer aluminum-based alloy bearing having superior compatibility and superior fatigue resistance according to claim 2, wherein an overlay of Sn, Pb or an alloy containing Sn and/or Pb as its main components is formed on the aluminum bearing alloy layer.

8. A multilayer aluminum-based alloy bearing having superior compatibility and superior fatigue resistance according to claim 2, wherein the bearing is provided on the surface thereof with flash-plated layer of Sn or Pb or an alloy of Sn and/or Pb.

9. A multilayer aluminum-based alloy bearing having superior compatibility and superior fatigue resistance according to claim 1, wherein the intermediate bonding layer further contains at least one kind selected from the group consisting of Si, Cr, Zr, Ti, B, V and Fe, the total amount thereof being not more than 3% by weight.

10. A multilayer aluminum-based alloy bearing having superior compatibility and superior fatigue resistance according to claim 9, wherein an overlay of Sn, Pb or an alloy containing Sn and/or Pb as its main components is formed on the aluminum bearing alloy layer.

11. A multilayer aluminum-based alloy bearing having superior compatibility and superior fatigue resistance according to claim 10, wherein the bearing is provided on the surface thereof with flash-plated layer of Sn or Pb or an alloy of Sn and/or Pb.

12. A multilayer aluminum-based alloy bearing having superior compatibility and superior fatigue resistance according to claim 9, wherein the bearing is provided on the surface thereof with flash-plated layer of Sn or Pb or an alloy of Sn and/or Pb.

13. A multilayer aluminum-based alloy bearing having superior compatibility and superior fatigue resistance according to claim 1, wherein an overlay of Sn, Pb or an alloy containing Sn and/or Pb as its main components is formed on the aluminum bearing alloy layer.

14. A multilayer aluminum-based alloy bearing having superior compatibility and superior fatigue resistance according to claim 13, wherein the bearing is provided on the surface thereof with flash-plated layer of Sn or Pb or an alloy of Sn and/or Pb.

15. A multilayer aluminum-based alloy bearing having superior compatibility and superior fatigue resistance according to claim 1, wherein the bearing is provided on the surface thereof with flash-plated layer of Sn or Pb or an alloy of Sn and/or Pb.

* * * * *